United States Patent [19]

Miller et al.

[11] Patent Number: 4,685,028
[45] Date of Patent: Aug. 4, 1987

[54] A.C. POWER ENTRY MODULE

[75] Inventors: Robert A. Miller, Chicago; David R. Marach, Sleepy Hollow, both of Ill.

[73] Assignee: Allied Corporation, Morris Township, Morris County, N.J.

[21] Appl. No.: 802,807

[22] Filed: Nov. 29, 1985

[51] Int. Cl.[4] .............................................. H02B 1/18
[52] U.S. Cl. .................................... 361/334; 361/344; 361/360; 361/395; 337/8; 337/188; 307/150
[58] Field of Search ........................... 200/50 A, 50 B; 307/150; 339/37; 337/4, 8, 186, 187, 188, 211, 212; 361/331, 332, 334, 335, 340, 344, 357, 360, 380, 392, 393–395, 399, 426, 430–432

[56] References Cited

U.S. PATENT DOCUMENTS

| | | | |
|---|---|---|---|
| 728,195 | 5/1903 | Brady | 361/340 |
| 1,936,802 | 11/1933 | Rugg | 361/340 |
| 3,728,586 | 4/1973 | Inhelder | 361/334 |
| 3,965,397 | 6/1976 | Pearsall, Jr. | 361/331 |
| 4,488,201 | 12/1984 | Webb | 361/334 |

Primary Examiner—G. P. Tulin
Attorney, Agent, or Firm—A. Jose Cortina; Roger H. Criss

[57] ABSTRACT

The invention relates to a power entry module for supplying power from an outside source to equipment with which the power entry module is in association. The module is made up of a one piece housing divided into at least two compartments with a first compartment having means housed therein for connection to an outside power source. A second compartment includes respective fuse clips for use with different size fuses for routing power from the outside power supply through the fuses and into the equipment requiring the power. A voltage card enables selection of the outside power supply within predetermined ranges and converts the incoming voltage to that required by the equipment depending upon the position of the card. A cover is hinged to the housing and when in closed position with an outside power supply plugged into the power entry module, has means for preventing opening of the cover to prevent access to the fuse compartment to avoid the danger of shock. When it is an open condition without a plug plugged into the power entry module, it prevents such a plug from being plugged in and thus, maintains the contacts of the fuse clip in neutral position thereby avoiding the danger of shock to a user of the device.

6 Claims, 5 Drawing Figures

A.C. POWER ENTRY MODULE

BACKGROUND OF THE INVENTION

This invention relates to a power entry module for supplying electrical power from an external source, usually A.C. line power. The power entry module is of the type which includes a plug receptacle for connecting a line power cord or cable which is detachable from the entry module. The power entry module also includes a fuse between the A.C. line power source and the remainder of the apparatus to which it is connected to prevent damage to the apparatus if excessive amounts of current are drawn and further, includes voltage selecting mean for switching the module for drawing voltage at a particular level and converting it to a voltage usable by the electrical instrument or apparatus with which it is associated.

U.S. Pat. No. 3,728,586 to Inhelder et al. teaches an A.C. power module with a power receptacle contained in one compartment of the module and a fuseholder, fuse ejector and line voltage switch contained in the other compartment. A safety mechanism prevents changing the fuse or line voltage setting while the A.C. line power cord is plugged into the instrument or appliance. In the preferred embodiment the safety device is a sliding door which covers either the A.C. line power receptacle or the fuseholder, ejector and line voltage switch. When access is provided to the compartment housing the fuseholder, ejector and line voltage switch, the fuse can be changed and the current or voltage designation can be changed by access to said compartment. The fuse ejector can be triggered at that point to thereby eject the fuse prior to reconnecting the module to an outside power source.

Although generally providing the feature of a safety interrupt to prevent power from being supplied through the module when access is provided to the fuseholder portion of the module, this device is generally unreliable and complicated in that the provision of the sliding door does not ensure safety since the sliding door structure can be easily disassembled or fall apart. Moreover, the fuse ejector mechanism is generally unreliable and can easily fail making the operation of the device generally complicated in nature. Still further, the fuse ejector mechanism operation is tied in to the voltage selection function and in order for the changing of the voltage to be effected, one must necessarily first eject the fuse, reset the voltage, and reinsert the fuse regardless of whether or not the fuse in the device at the time is appropriate for the voltage at which it was set or was being reset.

An alternative approach to an A.C. power entry module is disclosed in U.S. Pat. No. 4,488,201 of Webb et al. More particularly, the Webb device includes a plate having different size fuseholders, which plate can be positioned in various different positions depending upon the fuse desired to be employed in its particular application. The plate is housed inside a portion of the module and a cover is provided over the plate. A separate compartment includes a power entry module to which a cable can be connected, and an on-off switch allows entry of power through the module. A separate portion of the module includes means for housing a voltage selector card which will convert the incoming voltage to the appropriate voltage for the device. Although generally denying access to the live power part when the cover is pulled off, if the fuse plate is also pulled out of Webb, access can be had to the live contacts of the power entry module and as such, a danger to the user exists.

SUMMARY OF THE INVENTION

It is thus an object of the present invention to provide a power entry module of the type wherein it can be employed with various different types, i.e., levels, of voltages, as well as different size fuses, and wherein the power entry module provides a reliable and simple mechanism for denying substantially all access to the cable from a power supply to the entry module when the compartment holding the fuses and contacts for the fuses are accessible from the outside. By the expression "denying substantially all access" is meant that the possibility of even one contact of a power supply cord contacting a corresponding contact on the module is substantially eliminated. These and other objects will become more readily apparent from the following reading of the application.

In accordance with the invention, a power entry module is provided for supplying power from an outside source to equipment with which said module is in association. The module comprises a one piece housing divided into at least two compartments. A first compartment of the housing includes means housed therein for connection to an outside power source. A second compartment includes first contact means in electrical connection with the means housed in the first compartment as well as second contact means in electrical connection with circuit means in the one piece housing which is adapted for electrical connection to the equipment with which it is employed. The first and second contact means are constructed for holding fuses for establishing electrical connection through the fuses between the first and second contact means. A cover is hingedly connected to the one piece housing for covering the second compartment and for preventing access thereto. A blocking mechanism is provided on the cover for preventing the cover from being opened when a power supply cord is plugged into the module, and for preventing a power supply cord to be plugged into the module when the cover is opened. The blocking mechanism is constructed of a size and shape sufficient to deny substantially all access to power cord to the module. As such, a very simple device is provided which reliably minimizes the risk of shock to a user.

In another aspect, the invention further includes the feature of having, as part of the cover, a fuseholder which, when the cover is opened pulls the fuse out of engagement with the contacts in the housing to thereby remind the user that the status of the approriate fuse should be checked to conform to the voltage selected. A separate portion of the housing includes a printed circuit card receiving means which receives a printed circuit card which, depending upon the position at which it is inserted into the housing portion, adapts the power entry module for use with specific types or levels of line voltage, for example, either 100 volts, 120 volts, 220 volts, or 240 volts.

BRIEF DESCRIPTION OF THE DRAWINGS

Having briefly discussed the invention, other features and advantages will become more readily apparent from the following detailed discussion of the invention made with reference to the drawings wherein.

DETAILED DISCUSSION OF THE INVENTION

Figure 1:
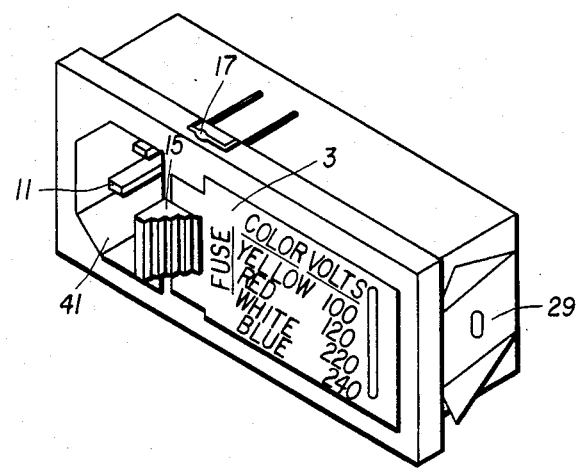
FIG. 1 is a perspective view of the power entry module in accordance with the invention, shown with the cover in closed position, and clearly illustrating the blocking mechanism thereof.

In FIG. 1 there is generally shown a power entry module 1 in accordance with the invention. As illustrated therein, the module 1 includes a compartment 41 which includes prongs or contacts 11 to permit an external power supply to be plugged thereinto by means of a conventional plug and cable. The power entry module 1 includes a cover 3 which is hinged to the entry module and has an engagement tab 15 to apply pressure for forcing the cover open.

Figure 3:
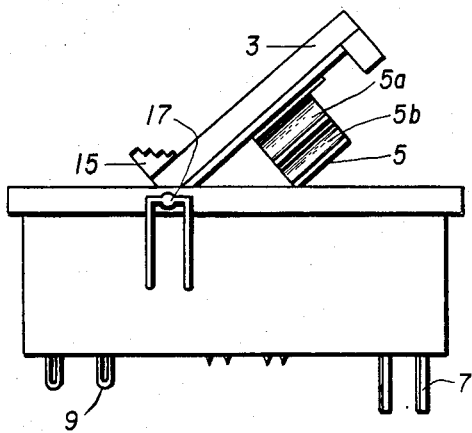
FIG. 3 is a side view showing the power entry module, with the cover in partially open condition, and illustrating the multiple fuseholders of the cover, as well as how the blocking function is performed with respect to the power cable receiving compartment portion.

As is more clearly shown in FIG. 3, this engagement tab 15 serves the function of both providing leverage to open the cover 3 as well as, when the cover is open, blocking access by an external power supply cord to the compartment 41 which has the prongs or contacts 11. In order to deny substantially all access to the external power supply cord, the tab 15 must be constructed of such a size and shape sufficient to prevent contact between even one contact of a power cord and a contact 11 of the module compartment 41, even, for instance, when the power cord plug is tilted in an express attempt to circumvent this safety feature. Alternatively, when the cover 3 is in closed position, and a power supply is plugged into the compartment 41, the cover 3 cannot be opened because the tab or portion 15 will abut against the cable thereby preventing access to the interior or fuseholding portion of the housing and thus, avoid the possiblity of inadvertent shock to the user.

Figure 2:
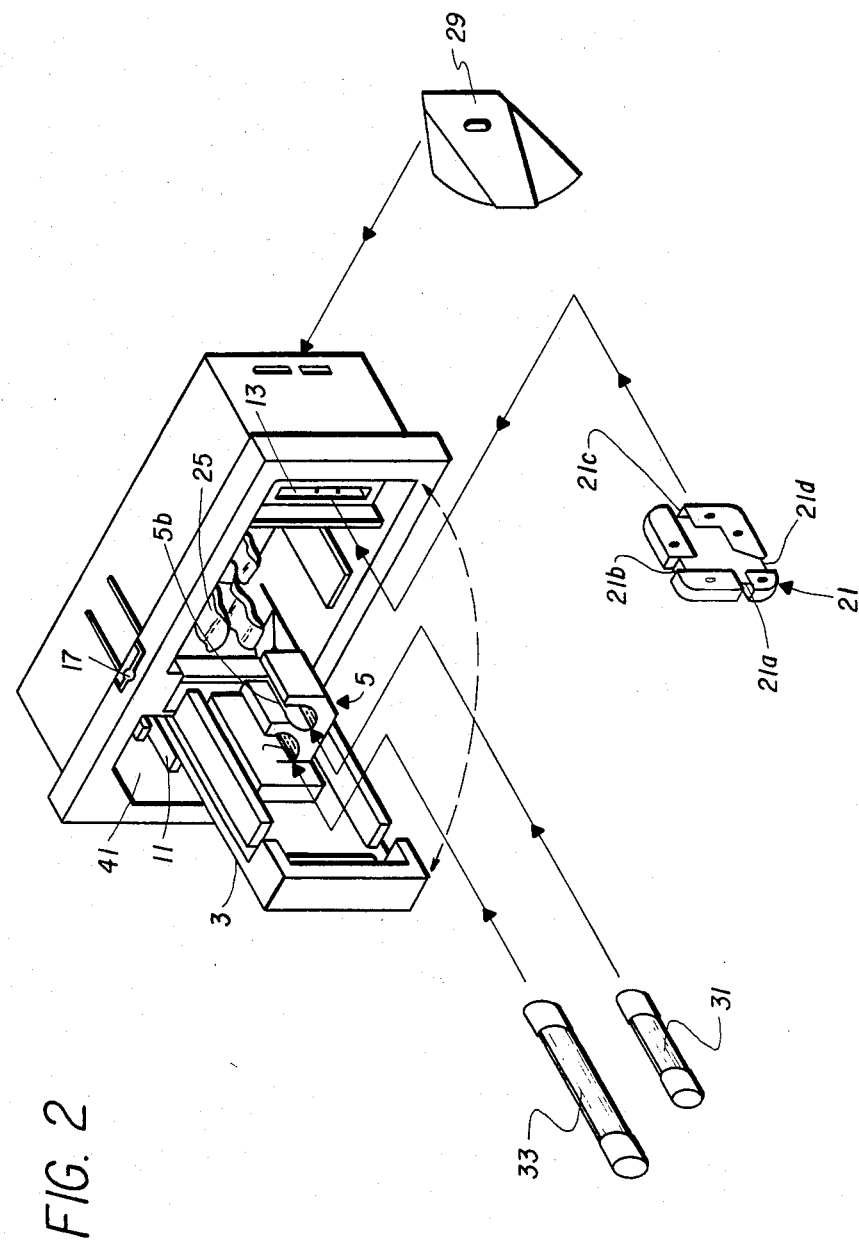
FIG. 2 is a perspective view of the power entry module with the cover open showing the two compartments, as well as the multiple fuseholding contacts, the printed circuit card receiving part of the compartment, and other parts thereof.
Figure 4:
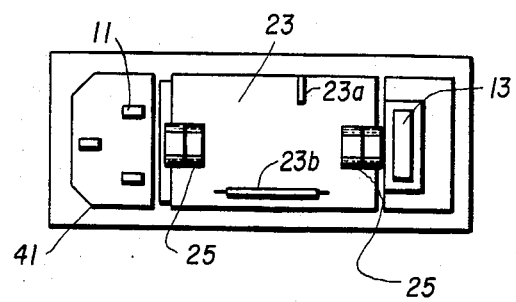
FIG. 4 is a top plan view of the power entry module with the cover removed clearly illustrating the two compartments, as well as the multiple fuseholding contacts and the printed circuit card receiving part of the compartment thereof.
Figure 5:
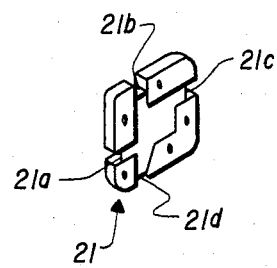
FIG. 5 is a perspective view of the printed circuit card showing the indicator or notches thereof.

As more clearly shown in the top plan view of FIG. 4, which does not include the cover 3, the housing includes a compartment 41 which includes the plug prongs or contacts 11 to establish electrical connection with an outside power supply through a power card. A separate compartment 23 is shown which houses fuse clips or contacts 25, which contacts 25 are of a dual nature to accommodate two different types of fuses depending upon the voltage application to which the power entry module is applied. A separate subcompartment 13 serves to accommodate the circuit card 21 as shown in FIGS. 2 and 5, which circuit card 21, depending upon the positioning thereof, will transform the incoming voltage to the desired voltage. The designation of the incoming voltage to which the module is being applied for use will be indicated by markings or notches on the side of the circuit card 21 as shown in FIGS. 2 and 5 as notches at 21a–21d, which will then show through marked slot 10 of the cover 3 as generally illustrated in FIG. 1, so that depending upon the orientation of the card 21 the user will then know what the incoming voltage is and what the necessary orientation of the card 21 to prevent damage to the equipment will be.

As further shown in FIGS. 2 and 3, the cover 3 will also include fuseholding means 5 which is capable of holding two different size fuses 31 and 33. These fuseholding means 5 are shown in FIGS. 2 and 3 as including fuse holding portions 5a and 5b. Depending upon the application, one fuse or another type will be placed in the appropriate fuseholding means 5 which will then, upon closing of the cover 3, engage the appropriate fuse clip within the housing. To ensure that the status of the fuse is checked every time the voltage of the housing is changed, the fuseholding means 5 automatically pulls the respective fuse out upon opening of the cover 3. Accordingly, a relatively simple and almost foolproof device is provided as a power entry module in accordance with the invention.

As shown in FIG. 3, connections 9 and 7 at the bottom of the power entry module serve for establishing the electrical contacts through the various parts of the equipment to which the power entry module is applied. Typically, the power entry module can be manufactured by simple molding processes for plastic materials with appropriate circuitry in the form of a simple circuit board 23a, placed at the bottom of the housing portion 23, but, for example, also interconnecting by means of a simple conductor 23b between board 21 and input contacts 11 to complete the circuit to connections 9 and 7 for connection with equipment with which the module is associated. It is of course understood that this is merely illustrated schematically with the arrangement of the circuit not being critical to the practice of the invention, and being able to take many forms as will be readily appreciated by those of ordinary skill in the art.

With respect to the housing itself, as noted, it can be manufactured of conventional plastic materials. It can be molded or any other conventional manufacturing technique can be employed and as noted, is preferably of a single piece construction, although a multiple part housing will also function adequately as well as readily apparent to those of ordinary skill in the art, the cover can also be manufactured of conventional plastics material like that of the main housing and can simply be snapped in place by a hinge snap engagement as shown as 17 in FIGS. 1–3. In order to facilitate mounting on a piece of equipment, the power entry module will also include mounting tabs 29, as shown in FIGS. 1 and 2, which snap into place in a corresponding snap engagement position.

What is claimed is:

1. A power entry module for supplying power from an outside source to equipment with which said module is in association, said module comprising:

one piece housing means divided into at least two compartments, a first compartment having outside contact means housed therein for connection to an outside power source and a second compartment having first contact means in electrical connection with said outside contact means housed in said first compartment, and second contact means in electrical connection with circuit means in said one piece housing means electrically connectable to said equipment, and said first and second contact means constructed for holding fuse means establishing electrical connection through said fuse means between said first and second contact means;

cover means hingedly connected to said one piece housing means covering said second compartment and preventing access thereto; and block means on said cover means preventing said cover means from being opened to permit access to said second compartment when said module is connected to an outside power source and preventing connection to an outside power source at said first compartment with said cover means hinged in an open position on said module.

2. A device as in claim 1 wherein said cover means includes fuseholding means for holding fuse means in a manner such that it disengages said fuse means held thereby from said first and second contact means when said cover means is opened and engages said fuse means held thereby to said first, and second contact means when closed.

3. A device as in claim 2 wherein said fuseholding means is constructed so as to be capable of holding at least two different size fuse means.

4. A device as in claim 1 further comprising a voltage selection circuit positioned in said module and movable into a plurality of different positions corresponding to the input voltage from a power supply for converting the input voltage to the voltage required for operation of equipment with which said module is associated.

5. A device as in claim 4 further comprising indicating means on said cover for indicating the positions of said voltage selection circuit and the input voltage being employed as an external power source.

6. A device as in claim 1 wherein said one piece housing means is made of molded plastic.

* * * * *